United States Patent [19]
Fuller

[11] 3,845,726
[45] Nov. 5, 1974

[54] RACK AND PINION HOPPER GATE ACTUATING MECHANISM

[75] Inventor: Oliver C. Fuller, Woodstock, Ill.

[73] Assignee: Evans Products Company Transportation Systems Division, Des Plaines, Ill.

[22] Filed: Jan. 11, 1974

[21] Appl. No.: 432,595

[52] U.S. Cl.............................. 105/282 P, 105/305
[51] Int. Cl......... B61d 7/20, B61d 7/22, B61d 7/26
[58] Field of Search............ 105/253, 282 A, 282 P, 105/282 R, 305, 308 P, 308 R; 298/8

[56] References Cited
UNITED STATES PATENTS

| | | | |
|---|---|---|---|
| 2,145,173 | 1/1939 | Hankins | 105/282 R |
| 2,145,174 | 1/1939 | Hankins | 105/282 R |
| 2,386,702 | 10/1945 | McBride | 105/282 P |
| 2,989,931 | 6/1961 | Joy | 105/282 P |
| 2,993,452 | 7/1961 | Dorey | 105/308 R X |
| 3,106,899 | 10/1963 | Dorey | 105/282 P X |
| 3,127,852 | 4/1964 | Beauchamp | 105/282 P X |
| 3,138,116 | 6/1964 | Dorey | 105/282 P X |
| 3,509,828 | 5/1970 | Fritz | 105/282 R |

Primary Examiner—M. Henson Wood, Jr.
Assistant Examiner—Howard Beltran
Attorney, Agent, or Firm—F. Travers Burgess

[57] ABSTRACT

Hopper structure comprising a discharge unit including a sliding closure gate having means effective at the end of the closing movement to lift the gate uniformly throughout its area and thereby close a gap between the gate and the hopper, but acting at the initiation of the opening movement to lower the gate uniformly throughout its area and thereby provide clearance between the gate and the hopper. The structure includes a rack and pinion mechanism for moving the gate between open and closed positions, the rack having square cut teeth and the pinion cylindrical teeth whereby to maintain the rack and pinion in full meshed engagement irrespective of the vertical position of the gate. Preferably the discharge unit may constitute a self-contained unit for application to the lower end of a railway car hopper or like body.

9 Claims, 4 Drawing Figures

RACK AND PINION HOPPER GATE ACTUATING MECHANISM

CROSS REFERENCE TO RELATED APPLICATION

Reference is made to an earlier application by the present inventor filed Oct. 13, 1972, Ser. No. 297,493, in which a similar gap-closing feature is disclosed and the gate is movable over support framing by a toggle mechanism.

BACKGROUND OF THE INVENTION

1. Field of the Invention

The invention relates to sliding closures for hopper outlets and consists particularly in the combination of a liftable gate and a compatible rack and pinion drive mechanism.

2. The Prior Art

The closest prior art, as best exemplified by George B. Dorey U.S. Pat. No. 3,106,899, utilizes a rack and pinion both having the usual involute teeth, and sealing is effected at the end of the closing movement by lifting the front edge of the gate only, while the rear end of the gate rests on the pinion. To provide a seal on the sides and rear, the gate has upstanding flanges on its sides and rear end.

SUMMARY OF THE INVENTION

The invention provides the combination of a simple yet effective rack and pinion type actuating mechanism with a hopper gate arranged to be lifted, uniformly throughout its area, into sealing engagement with the peripheral edge of the hopper outlet. This invention substantially eliminates friction between the gate and the hopper outlet, and provides a tight seal without the use of gaskets, while utilizing the simplicity and dependability of a rack and pinion to move the gate longitudinally between closed and open positions.

The above objectives are achieved by providing a rack having square cut teeth and a pinion having cylindrical teeth, as distinguished from the involute teeth of the Dorey U.S. Pat. No. 3,106,889, so that throughout the vertical movement of the gate, the rack and pinion are fully engaged at all times.

DETAILED DESCRIPTION

Figure 1:
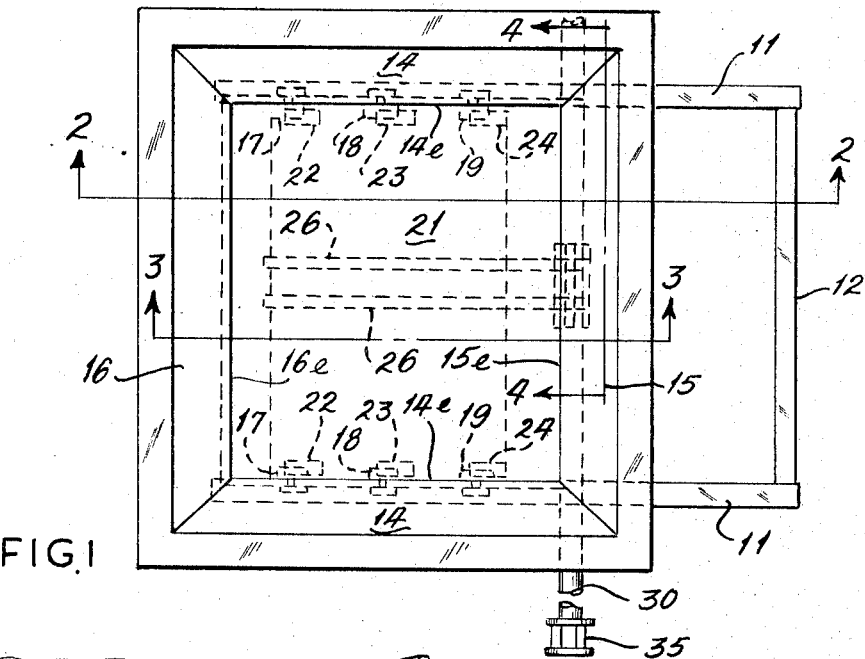
FIG. 1 is a plan view of a hopper outlet structure mounted on a support frame, and including a rack and pinion mechanism for actuating the hopper gate, showing the gate closed.

Structural channels 11, tube 12 and angle 13 are parts of the support frame for the hopper outlet structure and may be parts of a railway car or a storage bin or may constitute a self-contained unit applicable to a railway car or to a storage bin. The frame extends longitudinally and transversely and externally of the sloping plates 14, 15 and 16, which have coplanar horizontal lower edges 14e, 15e and 16e forming the rim of an outlet opening, the common plane of which is parallel to channels 11 and spaced vertically thereabove.

Journaled on channels 11 are a plurality of rollers 17, 18, 19. The forward pair of rollers 17 near the forward end of the outlet framing are journaled on channels 11 with their upper surface slightly below the level of the upper flange of the channel. The pair of rollers 18 intermediate the ends of the outlet framing are journaled on channels 11 at a slightly lower level than rollers 17. The rear pair of rollers 19 are journaled on channels 11 at a level slightly lower than rollers 18.

Gate 21 is a flat plate normally slidably supported on the upper flanges of channels 11 throughout the major portion of its length with its upper surface spaced below sloping plate edges 14e, 15e and 16e. Attached to the underside of gate 21 are short roller-engaging raised pads 22, 23 and 24 respectively whose relative thicknesses differ the same amounts as the differences in height of the upper surfaces of their respective rollers. During final closing movement of the gate, forward pads 22, which have cleared rollers 18 and 19, engage rollers 17. At the same time, intermediate pads 23, which have cleared rollers 19, engage rollers 18, and rear pads 24 engage rollers 19. These engagements lift the entire gate uniformly into substantially simultaneous contact with coplanar lower edges 14e, 15e and 16e of outlet plates 14, 15 and 16. It will be evident from the drawing, particularly FIG. 3, that during the final closing and lifting movement the plane of the gate will remain parallel to rim 14e, 15e, 16e of the outlet opening. The position of the gate when fully closed results in a closed joint between the gate and the edges of the outlet plates and prevents leakage of materials. At the beginning of the movement of the gate from closed position the pads ride off the rollers and the gate immediately lowers away from the coplanar edges of all the outlet plates. The weight of material within the hopper facilitates such lowering. This eliminates friction between the gate and the lower edges of the outlet plates.

Figure 2:
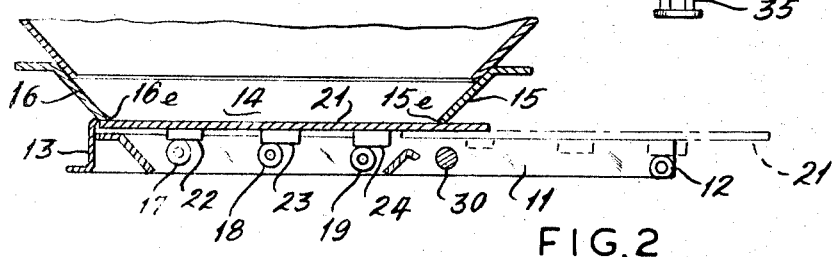
FIG. 2 is a longitudinal vertical section on line 2—2 of FIG. 1.
Figure 3:
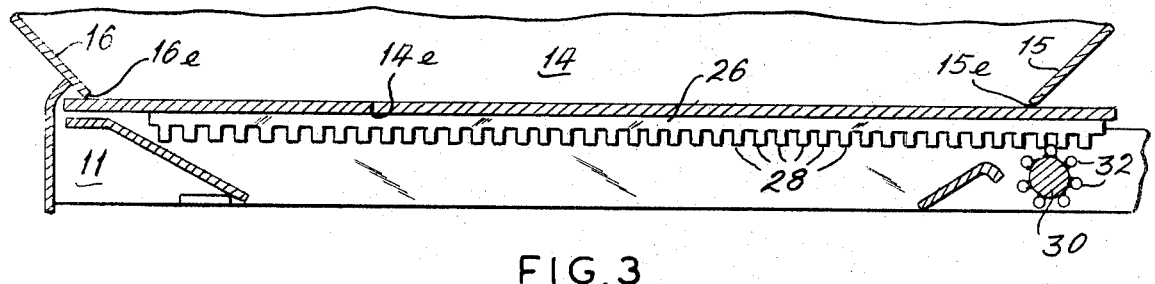
FIG. 3 is a longitudinal vertical section on line 3—3 of FIG. 1 but is drawn to a larger scale and shows the rack and pinion mechanism.
Figure 4:
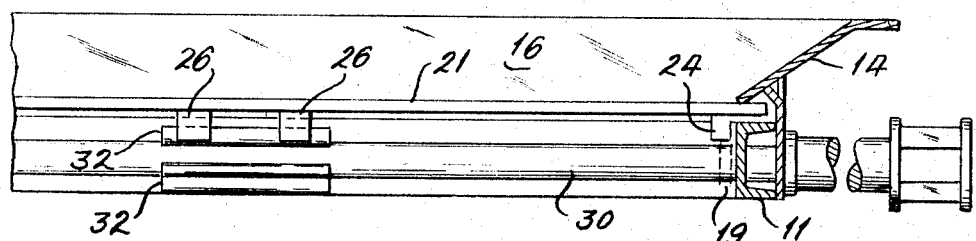
FIG. 4 is a transverse vertical section on line 4—4 of FIG. 1.

The gate is actuated by a rack and pinion mechanism comprising a pair of parallel rack bars 26 secured to the bottom of gate 21 and extending longitudinally thereof. Rack bars 26 are formed on their bottom edges with square cut teeth 28, as best seen in FIG. 3. For moving rack bars 26 and gate 21, a transverse shaft 30 is journaled in channels 11 beneath sloping plate 15 and, intermediate channels 11, a pinion is formed preferably by a plurality of short cylindrical rods welded to the surface of shaft 30 with their axes parallel to the shaft axis to form pinion teeth 32, the diameter and spacing of rods conforming to he pitch of the rack. From FIG. 3 it will be evident that rack teeth 28 and pinion teeth 32 will remain in fully meshed relation irrespective of whether gate 21 is in its raised closed position, as illustrated, or its lowered open position as shown in broken lines in FIG. 2, and the pinion will be equally effective to move the racks and the gate in both gate positions as well as in the nearly closed positions in which blocks 22, 23 and 24 are riding upwardly on rollers 17, 18 and 19 respectively. Thus the position of gate 21 is always under the positive control of shaft 30, and its longitudinal movements are fully responsive, at all times, to rotation of shaft 30.

For rotating shaft 30, its ends protrude outwardly from channels 11 and are provided with capstans at their extremities.

The structure described makes possible a substantial reduction in the over-all length of the gate assembly than that shown in my copending applications Ser. Nos. 238,885 and 297,493 because of the provision of the rack and pinion operating mechanism, and the provision of the latter with square-cut rack teeth and cylindrical pinion teeth makes it possible to use the advantageous rack and pinion drive with the liftable gate.

The details of the structure may be varied substantially without departing from the spirit of the invention and the exclusive use of such modifications as come within the scope of the appended claims is contemplated.

I claim:

1. A hopper structure including a support frame, an outlet chute carried thereby and having a downwardly facing rim and a gate therefor slidable along said frame between an outlet-open to an outlet-closing position, said gate being vertically spaced below said outlet rim while open and partially closed, elements on said frame and gate and interengaging to lift the entire gate uniformly throughout its area toward engagement with said rim as it approaches full outlet-closing position, a rack secured to the bottom of said gate, a pinion journaled on said support frame below said gate, said rack having square cut teeth and said pinion having cylindrical teeth in meshed relation with said rack teeth, the shapes of said rack and pinion teeth ensuring constant full engagement of said rack and pinion irrespective of vertical movements of said gate.

2. A hopper structure according to claim 1 wherein said pinion has a cylindrical shaft extending transversely outwardly from said support frame.

3. A hopper structure according to claim 2 wherein said pinion comprises a plurality of cylindrical rods secured to the peripheral surface of said shaft in circumferentially spaced relation with each other.

4. A hopper structure according to claim 3 wherein the diameter of said rods and the circumferential spacing therebetween each equal to the pitch of said rack.

5. A hopper structure according to claim 2 wherein said support frame comprises transversely spaced longitudinally extending side members and said shaft is journaled in said side members.

6. A hopper structure according to claim 5 wherein said rack is centered transversely of said gate and said pinion is correspondingly centered.

7. A hopper structure according to claim 6 wherein said rack comprises a pair of transversely spaced bars symmetrically disposed in closely spaced relation to the longitudinal center line of said gate.

8. A hopper structure according to claim 1 in which the gate lifting elements include rollers journaled on the support frame below said gate at points spaced apart along the direction of movement of said gate and pads on the underside of said gate engageable with said rollers as the gate approaches fully-closed position.

9. A hopper structure according to claim 8 in which the rollers near the rear end of the gate are lower than the rollers near the front end of the gate, and the pads near the front end are thinner than the pads at the rear end by the difference in height of the rollers.

* * * * *